United States Patent
Allen et al.

(10) Patent No.: US 10,935,285 B2
(45) Date of Patent: Mar. 2, 2021

(54) COOLING A TARGET USING ELECTRONS

(71) Applicant: Lockhead Martin Corporation, Bethesda, MD (US)

(72) Inventors: Edward Henry Allen, Bethesda, MD (US); Luke Alexander Uribarri, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 546 days.

(21) Appl. No.: 15/919,463

(22) Filed: Mar. 13, 2018

(65) Prior Publication Data

US 2018/0202694 A1 Jul. 19, 2018

Related U.S. Application Data

(62) Division of application No. 14/731,688, filed on Jun. 5, 2015, now Pat. No. 9,933,189.

(60) Provisional application No. 62/011,994, filed on Jun. 13, 2014.

(51) Int. Cl.
*F25B 21/00* (2006.01)

(52) U.S. Cl.
CPC ........ *F25B 21/00* (2013.01); *F25B 2321/003* (2013.01); *Y02B 30/66* (2013.01)

(58) Field of Classification Search
CPC ..... F25B 21/00; F25B 2321/003; F28F 13/00; F28F 2260/00; F28F 2250/00; F28F 2255/00

See application file for complete search history.

(56) References Cited

U.S. PATENT DOCUMENTS

| | | | |
|---|---|---|---|
| 2,841,726 | A | 7/1958 | Knechtli |
| 2,883,568 | A | 4/1959 | Beam et al. |
| 2003/0136923 | A1 | 7/2003 | Watson |
| 2004/0189141 | A1 | 9/2004 | Tavkhelidze |
| 2005/0034477 | A1* | 2/2005 | Hu .................. B64D 13/00 62/435 |
| 2008/0245054 | A1 | 10/2008 | Martensson |

FOREIGN PATENT DOCUMENTS

| | | |
|---|---|---|
| EP | 1681465 | 7/2006 |
| KR | 20070036173 | 4/2007 |
| KR | 102004033320 | 4/2007 |
| KR | 10-2012-0080271 | 7/2012 |
| RU | 2495788 | 7/2013 |

OTHER PUBLICATIONS

European Patent Office, Communication Pursuant to Article 94(3) EPC, Application No. 15 171 758.4-1008, 4 pages, dated Jan. 16, 2019.

(Continued)

*Primary Examiner* — Cassey D Bauer
(74) *Attorney, Agent, or Firm* — Baker Botts L.L.P.

(57) ABSTRACT

In an embodiment, a method includes, impinging a plurality of particles on a target such that electrons are emitted from the target and transporting the electrons from the target to a heat sink through a transporting medium. The target and the heat sink may be separated by a distance. The method further includes cooling the electrons using the heat sink and returning the electrons from the heat sink to the target.

9 Claims, 4 Drawing Sheets

(56) References Cited

OTHER PUBLICATIONS

Korean Intellectual Property Office; Notice of Allowance; Pat. Appl. No. 9-5-2020-006833817; 068527.428; 4 pages including machine translation, dated Jan. 29, 2020.
Korean Intellectual Property Office Notice of Preliminary Rejection; Pat. Appl. No. 10-2019-0137140; 068527.0601; 9 pages including machine translation, dated Nov. 20, 2019.
Korean Intellectual Property Office Notice of Allowance; Pat. Appl. No. 10-2015-0083289; 068527.0210; 4 pages, dated Jul. 30, 2019.
Touryan, K.J., "A Hypersonic Plasma Power Generator," AIAA Journal, vol. 3, No. 4, 1965, pp. 652-659, 1965.
European Patent Office, Communication, Extended European Search Report, Application No. 15171758.4-1602, 6 pages, dated Nov. 26, 2015.
Intellectual Property Office of Singapore, Search Report and Written Opinion, Application No. 10201504644U, 17 pages.
Japan Patent Office, Notice of Reason(s) for Rejection, Application No. 2015-118976, 7 pages, dated Mar. 5, 2019.

* cited by examiner

COOLING A TARGET USING ELECTRONS

RELATED APPLICATION

This application is a divisional of U.S. application Ser. No. 14/731,688 filed Jun. 5, 2015 entitled "COOLING A TARGET USING ELECTRONS" which claims benefit under 35 U.S.C. § 119(e) to U.S. Provisional Application No. 62/011,994 entitled "SYSTEM AND METHOD FOR COOLING A TARGET," filed Jun. 13, 2014, the entire content of which is incorporated herein by reference.

TECHNICAL FIELD

This invention relates generally to thermodynamics, and more particularly to cooling a target using electrons.

BACKGROUND

Certain applications may include targets that are heated to a temperature that causes deformation of the material of the target. However, deformation of the target adversely affects performance and efficiency, and may result in failure.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION

Figure 1:
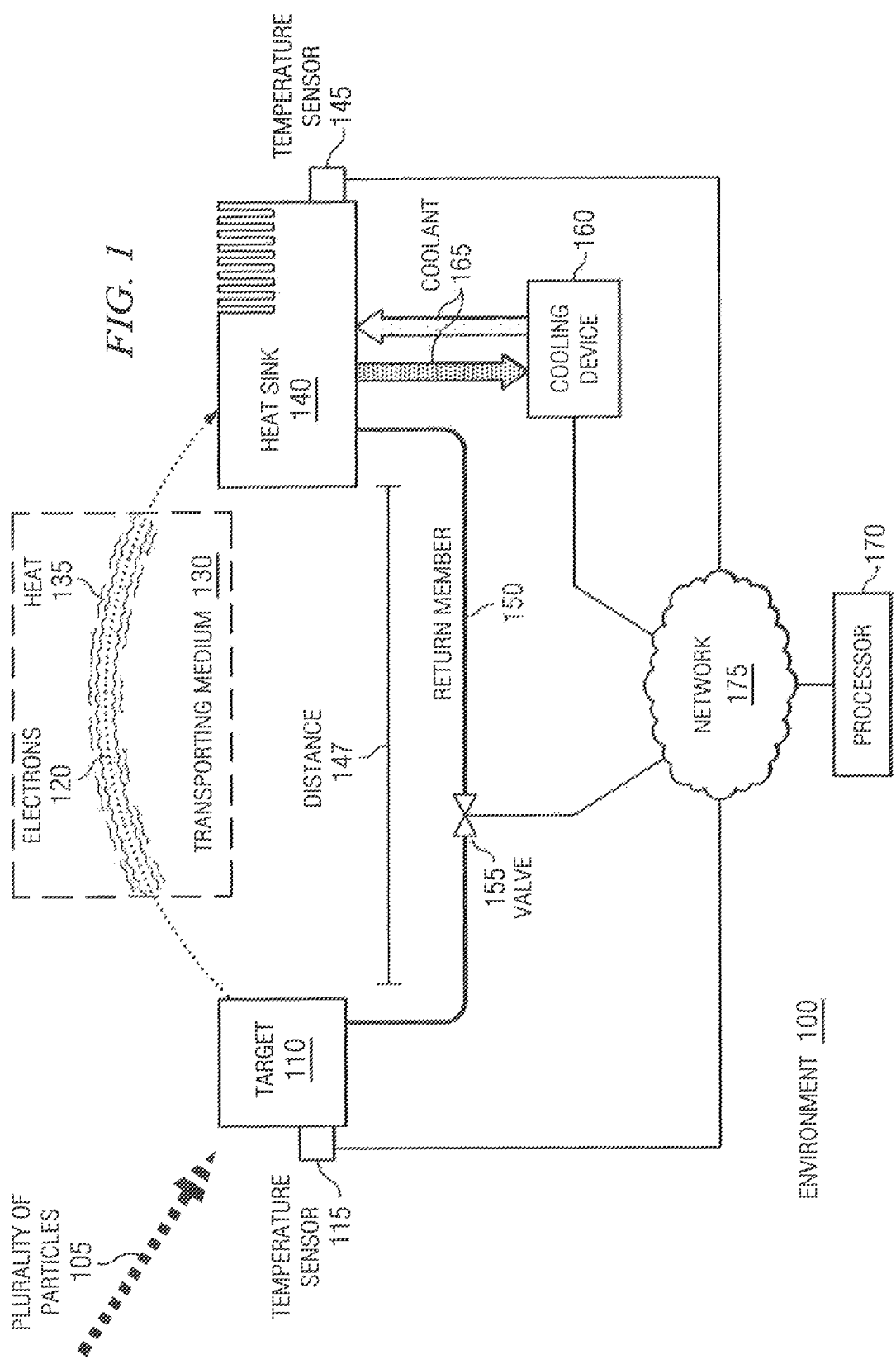
FIG. 1 is a diagram illustrating an example environment in which electrons of a target are cooled, according to certain embodiments of the present disclosure.

Targets may be used in various applications where the target is subject to intense heat. For example, as a space shuttle enters Earth's atmosphere at a high speed, the temperature of the space shuttle's wing may increase substantially. As another example, particle accelerators may be used to manufacture medical isotopes. As the beam current of the particle accelerator on the target feedstock increases, the temperature of the target feedstock also increases. Once the temperature of the target increases to a certain point, the target may deform. Deformation may include, for example, loss of structural integrity, oxidation, charring, or any other form of deformation. Deformation may reduce efficiency (e.g., increased aerodynamic drag), cause failure of the object, and increase material costs.

To overcome these and other problems, a target may be cooled by causing the target to emit electrons, cooling the emitted electrons in a heat sink, and returning the cooled electrons to the target. As a result, the cooled electrons reduce the temperature of the target without resulting in deformation of the target.

Accordingly, aspects of the present disclosure include a method that, in one embodiment, impinges a plurality of particles on a target so that electrons are emitted from the target and transports the electrons from the target to a heat sink through a transporting medium. The target and the heat sink may be separated by a distance. The method further includes cooling the electrons using the heat sink and returning the electrons from the heat sink to the target.

The present disclosure may provide numerous advantages. For example, using electrons to cool the target may provide a large amount of cooling without resulting in deformation of the target. Since the target is not deformed, the efficiency of the application may be increased. As another example, lower cost materials with low or moderate working temperatures may be used instead of expensive refractory materials because the heating of the target may occur at the surface of the target due to collisions with impinging beams or flows of particles. Since the surface of the target may be the site of the thermionic emission of electrons, the cooling of the target may occur without transporting heat into the bulk of the target. As a result, cheaper materials with low or moderate working temperatures may be used. This cooling technique may work even though the electrically emissive layer may only be a few molecules thick in embodiments. As another example, material costs may be reduced because deformation may be reduced or eliminated. As another example, separating the heat sink and the target by a distance may allow for the electrons to cool during the transportation of those electrons. As another example, since electrons are emitted from the target and returned to the target in a closed loop, there is not a capacity limitation because electrons are not depleted. As another example, cooling a target feedstock using electrons may allow for faster manufacture of medical isotopes because the beam current of a particle accelerator may be increased without deforming the target feedstock.

Figure 2A:
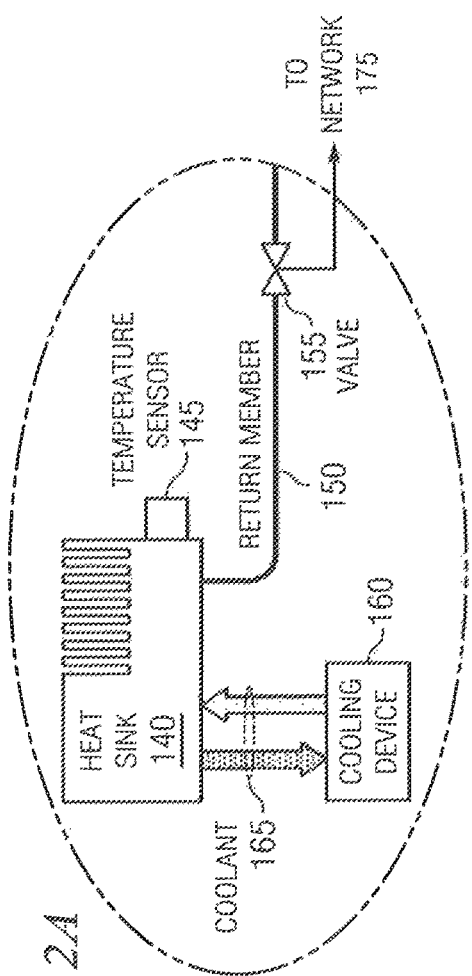
FIG. 2A is a diagram illustrating an enlarged detail view of a portion of the example embodiment of FIG. 2, according to certain embodiments of the present disclosure.
Figure 2:
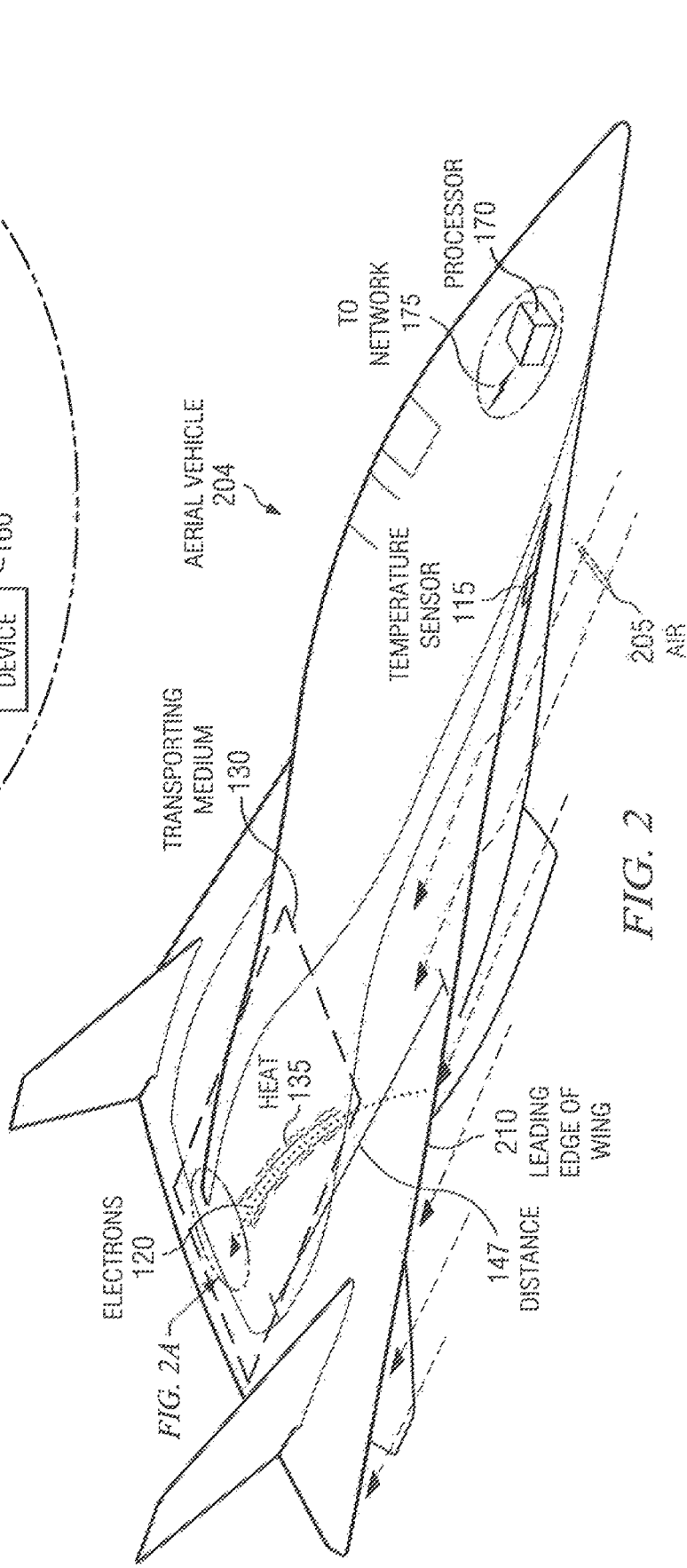
FIG. 2 is a diagram illustrating an example embodiment in which the target of FIG. 1 may be a leading edge of a wing of an aerial vehicle, according to certain embodiments of the present disclosure.
Figure 3:
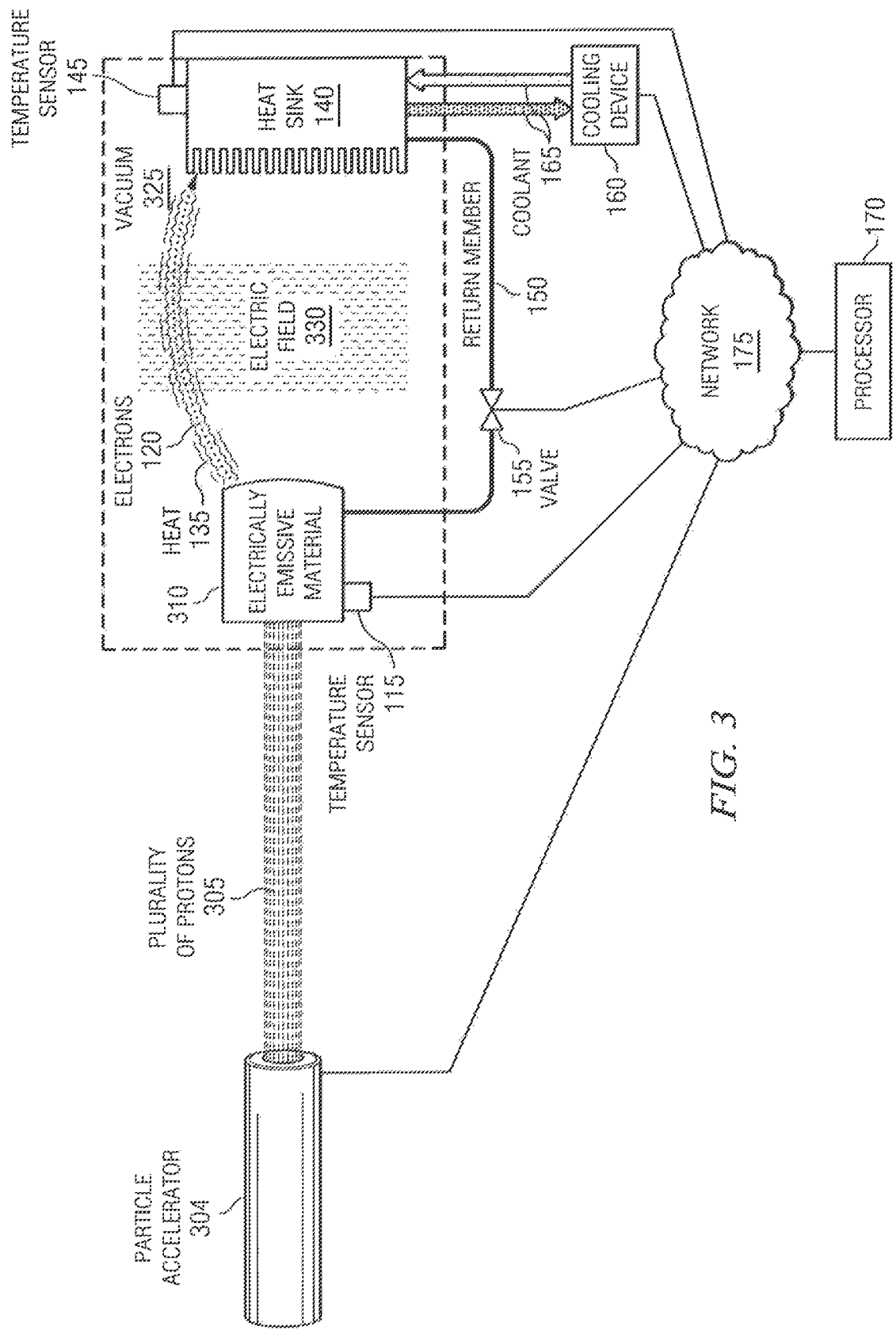
FIG. 3 is a diagram illustrating an example embodiment in which the target of FIG. 1 may be an electrically emissive material, according to certain embodiments of the present disclosure.
Figure 4:
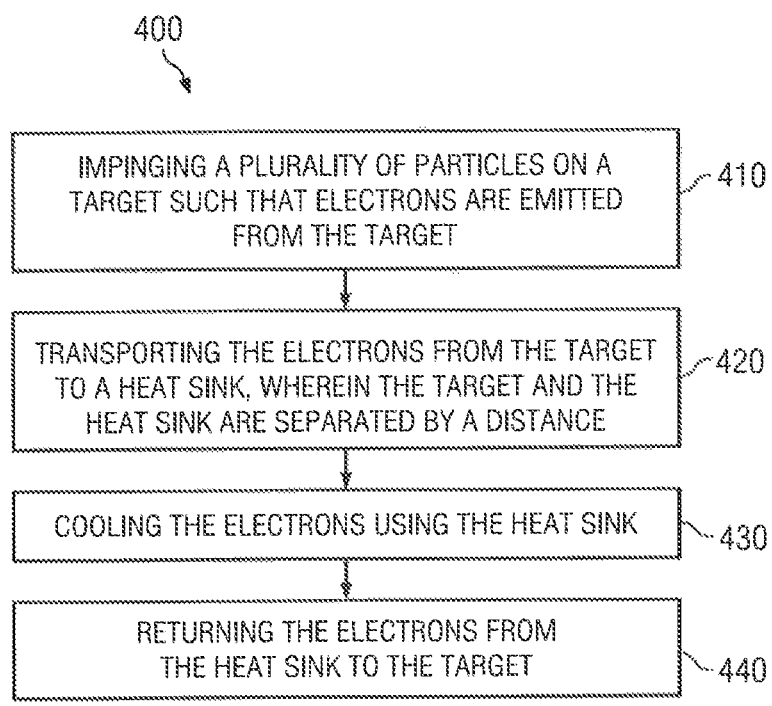
FIG. 4 is a flow chart illustrating an example method for cooling the target of FIG. 1, according to certain embodiments of the present disclosure.

Additional details are discussed in FIGS. 1 through 4. FIG. 1 illustrates an example environment 100 in which electrons 120 of target 110 are cooled. FIGS. 2-2A and 3 show example embodiments in which target 110 of FIG. 1 may be a leading edge of wing 210 of aerial vehicle 204 and electrically emissive material 310, respectively. FIG. 4 shows an example method for cooling target 110 of FIG. 1 using electrons.

FIG. 1 is a diagram illustrating an example environment 100 in which electrons 120 of target 110 are cooled, according to certain embodiments of the present disclosure. Environment 100 may include plurality of particles 105, target 110, temperature sensor 115, electrons 120, transporting medium 130, heat 135, heat sink 140, temperature sensor 145, distance 147, return member 150, valve 155, cooling device 160, coolant 165, processor 170, and network 175. In certain embodiments, plurality of particles 105 may be impinged on target 110, causing the temperature of target 110 to increase such that target 110 emits electrons 120. When the temperature of target 110 reaches the thermionic emission point, target 110 may emit electrons 120 exponentially. Electrons 120 may carry heat away from target 110 to heat sink 140 through transporting medium 130. Electrons 120 may disburse or reject heat 135 into transporting medium 130. Heat sink 140 may cool electrons 120 and return the cooled electrons 120 to target 110 using return member 150. As a result of returning the cooled electrons 120 to target 110, the temperature of target 110 may be reduced without deforming target 110. Such a cooling technique may provide substantial cooling of target 110, increase the efficiency of applications employing this cooling technique, and decrease material costs. Each component of environment 100 is discussed below.

Plurality of particles 105 may be any beam or flow of particles in certain embodiments. For example, plurality of particles 105 may be air. In that example, the air may be impinged on the leading edge of an aerial vehicle. As another example, plurality of particles 105 may be a plurality of protons. In that example, the plurality of protons may be emitted from a particle accelerator. Plurality of particles 105 may be directed towards target 110 in certain embodiments. For example, as noted above, plurality of particles 105 may be air that impinges on the leading edge of an aerial vehicle. As another example, plurality of particles 105 may be a plurality of protons emitted from a particle accelerator towards an electrically emissive material. Plurality of particles 105 may cause the temperature of target 110 to increase such that target 113 emits electrons 120 in certain embodiments. For example, as an aerial vehicle travels at supersonic or hypersonic speeds, the temperature of the leading edge of the wing may increase such that the leading edge emits electrons 120. As another example, a particle accelerator may impinge a plurality of protons on an electrically emissive material (e.g., to produce a medical isotope, such as technetium 99$m$), thereby increasing the temperature of the electrically emissive material such that the electrically emissive material emits electrons 120. When the temperature of target 110 reaches the thermionic emission threshold, the emission of electrons 120 increases exponentially.

Target 110 may be any object that includes electrons 120 in certain embodiments. For example, target 110 may be the leading edge of an aerial vehicle. As another example, target 110 may be an electrically emissive material, such as molybdenum or technetium 99$m$. Target 110 may be coupled to temperature sensor 115 and/or return member 150 in certain embodiments. In some embodiments, target 110 may have a cross-sectional area less than a cross-sectional area of heat sink 140. Due to plurality of particles 105 impinging on target 110, the temperature of target 110 may increase such that target 110 emits electrons 120 in certain embodiments. For example, where target 110 is the leading edge of an aerial vehicle, the temperature of that leading edge may heat up significantly as the aerial vehicle travels at high speeds. As the temperature of the leading edge increases, the leading edge may emit electrons 120. When the temperature of the leading edge reaches the thermionic emission threshold of the leading edge, the leading edge may emit electrons 120 exponentially.

Temperature sensor 115 may be any sensor configured to measure a temperature of target 110 in certain embodiments. For example, temperature sensor 115 may be a thermometer, a thermocouple, or any other sensor configured to measure the temperature of target 110. Temperature sensor 115 may be coupled to target 110 in any manner in some embodiments. Temperature sensor 115 may be coupled to network 175 in any manner (e.g., wired or wireless) in certain embodiments. Temperature sensor 115 may transmit temperature measurements of target 110 to processor 170 through network 175. Processor 170 may use those measurements to determine whether to adjust a rate of flow of coolant 165 from cooling device 160 to heat sink 140 in some embodiments. Processor 170 may use temperature measurements of target 110 to adjust valve 155. For example, processor 170 may determine that the temperature of target 110 is too high and open valve 155 to allow for more cooling electrons 120 to return to target 110 through return member 150.

Electrons 120 may be any electrons of target 110 in certain embodiments. Electrons 120 may be free electrons in an embodiment. That is, electrons 120 may not be bound to other molecules. Electrons 120 may be emitted from target 110 as the temperature of target 110 increases. When the temperature of target 110 reaches the thermionic emission threshold of target 110, the emission of electrons 120 increases exponentially. As electrons 120 are emitted, each electron carries heat away from target 110. In some embodiments, electrons 120 may travel from target 110 to heat sink 140 through transporting medium 130. Electrons 120 may be cooled in heat sink 140 in certain embodiments. Electrons 120 may also be cooled during transportation through transporting medium 130. For example, electrons 120 may reject heat 135 into transporting medium 130. After electrons 120 are cooled in heat sink 140, the cooled electrons 120 may be returned to target 110 through return member 150 in a closed loop (i.e., recirculated). Although electrons 120 are discussed throughout this disclosure, other particles may be used to cool target 110. For example, any type of fermion may be used. As another example, muons may be used.

Transporting medium 130 may be any medium capable of transporting electrons 120 in certain embodiments. For example, transporting medium 130 may be air. As another example, transporting medium 130 may be a vacuum. As another example, transporting medium 130 may include a conductive medium of ionized plasma. In that example, the conductive medium of ionized plasma may be formed as a shockwave travels off of the front of an aerial vehicle. During the transportation of electrons 120 through transporting medium 130, electrons 120 may be cooled. For example, electrons 120 may disburse or reject heat 135 into transporting medium 130. Transporting medium 130 may transport electrons 120 from target 110 to heat sink 140.

Heat 135 may be any heat of electrons 120 that may be disbursed, or rejected into transporting medium 130 as electrons 120 are transported from target 110 to heat sink 140 in an embodiment. Heat 135 may be disbursed or rejected via radiation or conduction (e.g., conductive collisions) in an embodiment.

Heat sink 140 may be any device configured to capture and cool electrons 120. For example, heat sink 140 may be a structure with a plurality of fins extending vertically from a base. Heat sink 140 may be any type of heat sink, such as a pin heat sink, a straight heat sink, or a flared heat sink. Heat sink 140 may be a radiator in an embodiment. Heat sink 140 may capture emitted electrons 120 from transporting medium 130 in some embodiments. For example, heat sink 140 may be positively charged such that the emitted electrons 120, which are negatively charged, are attracted to heat sink 140, in some embodiments, heat sink 140 may cool electrons 120 by dissipating heat into a surrounding area. Heat sink 140 may be separated from target 110 by distance 147, which may allow electrons 120 to cool in transporting medium 130 prior to being cooled in heat sink 140. Heat sink 140 may be coupled to temperature sensor 145 and/or return member 150 in any manner in certain embodiments. Heat sink 140 may also be in fluid communication with cooling device 160. For example, heat sink 140 may receive coolant 155 from cooling device 160. As explained below, coolant 165 may cool heat sink 140 as its temperature increases due to receiving electrons 120 from target 110. In certain embodiments, heat sink 140 may have a cross-sectional area that is greater than a cross-sectional area of target 110. For example, a ratio of a cross-sectional area of heat sink 140 to a cross-sectional area of target 110 may be greater than one. Generally, providing a ratio of a cross-sectional area of heat sink 140 to a cross-sectional area of target 110 greater than one may provide for greater heat transfer from target 110 to heat sink 140.

Temperature sensor 145 may be any sensor configured to measure a temperature of heat sink 140 in certain embodiments. For example, temperature sensor 145 may be a thermometer, a thermocouple, or any other sensor configured to measure the temperature of heat sink 140. Temperature sensor 145 may be coupled to heat sink 140 in any manner in some embodiments. Temperature sensor 145 may be coupled to network 175 in any manner (e.g., wired or wireless) in certain embodiments. Temperature sensor 145 may transmit temperature measurements of heat sink 140 to processor 170 through network 175. Processor 170 may use those measurements to adjust a rate of flow of coolant 165 from cooling device 160 to heat sink 140 in some embodiments.

Distance 147 may be any distance that separates target 110 from heat sink 140 in certain embodiments. For example, distance 147 may be the distance between a leading edge of an aircraft and a rear portion of the aircraft where heat sink 140 may be positioned in some embodiments. As another example, distance 147 may be any non-zero distance such that target 110 and heat sink 140 are not adjacent. Separating heat sink 140 and target 110 using distance 147 may allow electrons 120 to cool in transporting medium 130. Distance 147 may be any distance. For example, distance 147 may be six inches. As another example, distance 147 may be six feet.

Return member 150 may be any device configured to transport electrons 120 in certain embodiments. Return member 150 transports cooled electrons 120 from heat sink 140 to target 110 such that cooled electrons 120 are returned to target 110 in an embodiment. Return member 150 may be a wire in some embodiments. Return member 150 may be coupled to heat sink 140 and/or target 110 in an embodiment. Return member 150 may include valve 155 in an embodiment.

Valve 155 may be any type of controllable valve in an embodiment. For example, valve 155 may be a silicone control rectifier. As another example, valve 155 may be a field effect transistor. Valve 155 may be coupled to return member 150 in an embodiment. Valve 155 may be coupled to processor 170 via network 175 in an embodiment. Valve 155, through signals received from processor 170 via network 175, may control the flow of electrons 120 through return member 150 in an embodiment. For example, valve 155 may receive signals from processor 170 via network 175 instructing valve 155 to open or close (partially or fully). As the temperature of target 110 increases to a certain range or point, as discussed below, valve 155 may receive a signal from processor 170 via network 175 instructing valve 155 to increase its opening to allow more cooling electrons 120 through return member 150. Allowing more cooling electrons 120 to return to target 110 may decrease the temperature of target 110. As the temperature of target 110 decreases to a certain range or point, valve 155 may receive a signal from processor 170 via network 175 instructing valve 155 to decrease its opening to allow fewer cooling electrons 120 through return member 150. Allowing fewer cooling electrons 120 to return to target 110 may increase the temperature of target 110. By controlling the flow of electrons 120, valve 155 (via signals received from processor 170) may control the temperature of target 110 so that target 110 maintains a constant temperature below the maximum working temperature of target 110. Maintaining such a temperature may prevent target 110 from deforming.

Cooling device 160 may be any device configured to cool heat sink 140 in certain embodiments. For example, cooling device 160 may be a pump that pumps coolant 165 through heat sink 140. Cooling device 160 may be in fluid communication with heat sink 140. For example, cooling device 160 may apply coolant 165 to heat sink 140. In that example, cooling device 160 may receive coolant 165 back from heat sink 140. Cooling device 160 may be coupled to network 175 in an embodiment. Cooling device 160 may be controlled by processor 170 through network 175 in some embodiments. For example, cooling device 160 may receive a signal from processor 170 through network 175 directing cooling device 160 to change a rate of fluid flow of coolant 165 into heat sink 140. In that example, cooling device 160 may be instructed to change a rate of flow of coolant 165 based on temperature readings from temperature sensor 115 and/or temperature sensor 145.

Coolant 165 may be any fluid or gas used to cool heat, sink 140 in an embodiment. For example, coolant 165 may be water. As another example, coolant 165 may be a refrigerant. As another example, coolant 165 may be fuel. Coolant 165 may be transported from cooling device 160 to heat sink 140 and returned from heat sink 140 to cooling device 160 in certain embodiments. As a result of coolant 165 being applied to heat sink 140, coolant 165 may carry heat away from heat sink 140 thereby cooling heat sink 140.

Processor 170 may control the operation of temperature sensor 115, temperature sensor 145, valve 155, and/or cooling device 160 by processing data received through network 175 and sending signals through network 175 in certain embodiments. Processor 170 may control the operation of particle accelerator 304 (discussed below) in some embodiments. Processor 170 may receive temperature measurements from temperature sensor 115 and/or temperature sensor 145 either directly or through network 175 in certain embodiments. Based on the temperature measurements from temperature sensor 115 and/or temperature sensor 145, processor 170 may determine whether to adjust a rate of flow of coolant 165 from cooling device 160 to heat sink 140 in an embodiment. For example, as the temperature measurement from temperature sensor 145 increases, processor 170 may determine to increase a rate of coolant 165.

Processor 170 may regulate the temperature of target 110 by controlling the flow of electrons 120 through valve 155 in an embodiment. For example, processor 170 may adjust the opening or closing of valve 155 based on temperature measurements from temperature sensor 115 indicating the temperature of target 110. As the temperature measurements of target 110 increase, processor 170 may send a signal to valve 155 via network 175 instructing valve 155 to increase its opening to allow more cooling electrons 120 to return to target 110. As the temperature measurements of target 110 decrease, processor 170 may send a signal to valve 155 via network 175 instructing valve 155 to decrease its opening to allow fewer cooling electrons 120 to return to target 110. Processor 170 may determine those adjustments in any manner. For example, processor 170 may compare the temperature measurements of target 110 to a threshold value and adjust valve 155 if the measurements are within a certain percentage of the threshold value (e.g., 10%, 20%, 30%, or any other percentage). By controlling valve 155, processor 170 may control the temperature of target 110 so that the temperature remains constant. Additionally, controlling valve 155 may allow processor 170 to maintain the temperature of target 110 below the maximum working temperature of target 110, which may prevent target 110 from deforming. Controlling valve 155 may also allow processor 170 to prevent the temperature of target 110 from dropping too much. For example, processor 170 may decrease the flow of electrons 120 to prevent the temperature of target 110 from dropping to a temperature range where the material of target 110 may crack.

Processor 170 includes any hardware and/or software that operates to control and process information. For example, processor 170 may execute logic to control the operation of cooling device 160 and/or particle accelerator 304. Processor 170 may be a programmable logic device, a microcontroller, a microprocessor, any suitable processing device, or any suitable combination of the preceding.

Network 175 may be any suitable network operable to facilitate communication between temperature sensor 115, temperature sensor 145, valve 155, cooling device 160, and processor 170. In some embodiments, network 175 may be operable to facilitate communication between particle accelerator 304 and processor 170. Network 175 may include any interconnecting system capable of lly emissive material 310 may be any type of electride n an embodiment. As another example, electrically emis all or a portion of a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between temperature sensor 115, temperature sensor 145, valve 155, cooling device 160, processor 170, and/or particle accelerator 304.

As an example embodiment of operation, plurality of particles 105 may be impinged on target 110. As the temperature of target 110 increases, target 110 emits electrons 120. Electrons 120 may be transported from target 110 to heat sink 140 through transporting medium 130. Heat sink 140 may cool electrons 120 and return cooled electrons 120 to target 110 using return member 150. As the cooled electrons 120 are returned to target 110, the temperature of target 110 may decrease.

Example embodiments that may implement the components of FIG. 1 are described below with respect to FIGS. 2-2A and FIG. 3. In particular, FIG. 2 illustrates an example embodiment where target 110 of FIG. 1 may be leading edge of wing 210 on aerial vehicle 204, FIG. 2A illustrates an enlarged detail view of a portion of aerial vehicle 204, and FIG. 3 illustrates an example embodiment where target 110 of FIG. 1 may be electrically emissive material 310. Although FIGS. 2-2A and FIG. 3 illustrate many components from FIG. 1, those components will not be discussed again with respect to FIGS. 2-2A and FIG. 3.

FIG. 2 is a diagram illustrating an example embodiment in which target 110 of FIG. 1 may be leading edge of wing 210 of aerial vehicle 204, according to certain embodiments of the present disclosure. In this example embodiment, target 110 of FIG. 1 may be leading edge of wing 210 and plurality of particles 105 may be air 205.

Aerial vehicle 204 may be any vehicle configured to travel through air 205 in an embodiment. For example, aerial vehicle 204 may be a scram jet. As another example, aerial vehicle 204 may be a jet. As another example, aerial vehicle 204 may be a space vehicle, such as a space shuttle. Aerial vehicle 204 may include heat sink 140 separated from a leading edge of wing 210 by distance 147. For example, heat sink 140 may be positioned towards the rear of aerial vehicle 204. As another example, heat sink 140 may be positioned at the rear of a wing of aerial vehicle 204. In that manner, as aerial vehicle 204 travels through air 205, air 205 forces electrons 120 emitted from leading edge of wing 210 towards heat sink 140 in the rear of aerial vehicle 204.

Air 205 may be any portion of an atmosphere in an embodiment. For example, air 205 may be a portion of Earth's atmosphere. Air 205 may be impinged on leading edge of wing 210 thereby causing the temperature of leading edge of wing 210 to increase.

Leading edge of wing 210 may be a portion of a wing of aerial vehicle 204 that is the foremost edge of the wing in an embodiment. Leading edge of wing 210 may include electrons 120. Leading edge of wing 210 may be any shape. For example, leading edge of wing 210 may be straight. As another example, leading edge of wing 210 may be curved. Leading edge of wing 210 may be swept in some embodiments. Leading edge of wing 210 may be unswept in certain embodiments. Leading edge of wing 210 may be made of any material. For example, leading edge of wing 210 may be made of aluminum. As leading edge of wing 210 is impinged with air 205, the temperature of leading edge of wing 210 may increase such that leading edge of wing 210 emits electrons 120. As noted above, when the temperature of leading edge of wing 210 reaches the thermionic emission point of leading edge of wing 210, the emission of electrons 120 increases exponentially.

As an example embodiment of operation, aerial vehicle 204 may be travelling at extremely high speeds through air 205. For example, aerial vehicle 204 may travel at Mach 5 speed. As another example, aerial vehicle 204 may travel at Mach 6 speed. As air 205 impinges on leading edge of wing 210, the temperature of leading edge of wing 210 increases. The temperature of leading edge of wing 210 may increase such that electrons 120 are emitted from leading edge of wing 210. Electrons 120 each carry away heat 135 from leading edge of wing 210. Since aerial vehicle 204 may be travelling at high speeds through air 205, air 205 pushes the emitted electrons 120 from leading edge of wing 210 to heat sink 140 positioned behind leading edge of wing 210. Heat sink 140 captures the emitted electrons 120. Heat sink 140 cools electrons 120 and returns the cooled electrons 120 back to leading edge of wing 210 through return member 150. As a result of returning cooled electrons 120 to leading edge of wing 210, leading edge of wing 210 may be cooled. Cooling leading edge of wing 210 by cooling electrons 120 emitted from leading edge of wing 210 provides significant cooling capability without deforming leading edge of wing 210.

FIG. 3 is a diagram illustrating an example embodiment in which target 110 of FIG. 1 may be electrically emissive material 310, according to certain embodiments of the present disclosure. In this example embodiment, plurality of particles 105 may be a plurality of protons 305 and target 110 may be electrically emissive material 310. As described below, particle accelerator 304 may emit plurality of protons 305, which are impinged on electrically emissive material 310. As electrically emissive material 310 increases in temperature, electrically emissive material 310 may emit electrons 120, which travel across vacuum 325 to heat sink 140 through electric field 330. Heat sink 140 may cool electrons 120 and return the cooled electrons to electrically emissive material 310.

Particle accelerator 304 may be any device configured to impinge protons 305 on electrically emissive material 310. For example, particle accelerator 304 may be a cyclotron. Particle accelerator 304 may be coupled to processor 170 through network 175 in an embodiment. In some embodiments, processor 170 may transmit a signal to particle accelerator 304 through network 175 to adjust the beam current of particle accelerator 304.

Plurality of protons 305 may be any beam of protons in an embodiment. Protons 305 may be emitted from particle accelerator 304 in an embodiment. Protons 305 may impinge on electrically emissive material 310 in an embodiment. As a result of that impingement, electrically emissive material 310 may increase in temperature.

Electrically emissive material 310 may be any type of chemically inert material that is not subject to oxidation in an embodiment. For example, electrically emissive material 310 may include molybdenum. As another example, electrically emissive material 310 may be a mayenite electride (calcium aluminate). Electrically emissive material 310 may be any type of electride in an embodiment. As another example, electrically emissive material 310 may be the target feedstock for a medical isotope. As another example, electrically emissive material 310 may be a ceramic electride. As another example, electrically emissive material 310 may be aluminum. Electrically emissive material 310 may include electrons 120 in an embodiment. As the temperature of electrically emissive material 310 increases, electrically emissive material 310 may emit electrons 120. When the temperature of electrically emissive material 310 reaches the thermionic emission threshold, electrically emissive material 310 may emit electrons 120 exponentially.

Vacuum 325 may be any space where the pressure is lower than atmospheric pressure. For example, vacuum 325 may be a space that is devoid of matter. As another example, vacuum 325 may be a partial vacuum. Vacuum 325 may include electric field 330 in certain embodiments. For example, electric field 330 may pull electrons 120 through vacuum 325 from electrically emissive material 310 to heat sink 140.

Electric field 330 may be any component of an electromagnetic field in an embodiment. Electric field 330 may facilitate the transportation of emitted electrons 120 to heat sink 140 through vacuum 325 in an embodiment. Electric field 330 may arise artificially or naturally. For example, electric field 330 may be artificially created by applying a voltage potential between electrically emissive material 310 and heat sink 140. As another example, electric field 330 may arise naturally as a result of differences in charge between the point where electrons 120 are emitted (i.e., target 110) and the point where electrons 120 are collected (i.e., heat sink 140).

As an example embodiment of operation, particle accelerator 304 may impinge protons 305 on electrically emissive material 310, causing the temperature of electrically emissive material 310 to increase. The temperature of electrically emissive material 310 may increase such that electrically emissive material 310 emits electrons 120. Electrons 120 may carry heat away from electrically emissive material 310. Electrons 120 may be pulled towards heat sink 140 through vacuum 325 using electric field 330. Heat sink 140 may capture electrons 120 and cool electrons 120. Heat sink 140 may return the cooled electrons 120 to electrically emissive material 310 using return member 150. Returning the cooled electrons 120 to electrically emissive material 310 may decrease the temperature of electrically emissive material 310. Accordingly, returning the cooled electrons 120 provides significant cooling of electrically emissive material 310 without deforming electrically emissive material 310.

FIG. 4 is a flow chart illustrating an example method 400 for cooling target 110 of FIG. 1, according to certain embodiments of the present disclosure. Method 400 begins at step 410, where plurality of particles 105 may be impinged on target 110 such that electrons 120 are emitted from target 110. For example, plurality of particles 105 may be air 205 that is impinged on leading edge of wing 210 of aerial vehicle 204. As another example, plurality of particles 105 may be protons 305 emitted from particle accelerator 304 and impinged on electrically emissive material 310.

At step 420, electrons 120 may be transported from target 110 to heat sink 140. For example, electrons 120 may be emitted from leading edge of wing 210 and transported to heat sink 140 through transporting medium 130. As another example, electrons 120 may be emitted from electrically emissive material 310 and transported from electrically emissive material 310 to heat sink 140 through electric field 330 of vacuum 325. In some embodiments, target 110 and heat sink 140 may be separated by distance 147.

At step 430, electrons 120 may be cooled using heat sink 140. As noted above, electrons 120 may carry heat away from target 110. As electrons 120 are passed through heat sink 140, electrons 120 may be cooled.

At step 440, electrons 120 may be returned from heat sink 140 to target 110. For example, cooled electrons 120 may be returned from heat sink 140 to leading edge of wing 210 of aerial vehicle 204. As another example, cooled electrons 120 may be returned from heat sink 140 to electrically emissive material 310. In some embodiments, cooled electrons 120 are returned from heat sink 140 to target 110 using return member 150.

As an example embodiment of operation, plurality of particles 105 may be impinged on target 110, causing the temperature of target 110 to increase. The temperature of target 110 may increase such that target 110 emits electrons 120. Electrons 120 may carry heat away from target 110. Electrons 120 may be transported across transporting medium 130 to heat sink 140, where electrons 120 are cooled. The cooled electrons 120 are returned to target 110 using return member 150. Returning cooled electrons 120 to target 110 decreases the temperature of target 110 without deforming target 110.

The present disclosure may provide numerous advantages. For example, using electrons 120 to cool target 110 may provide a large amount of cooling without resulting in deformation of target 110. As another example, since deformation is reduced or eliminated, material costs may be reduced. As another example, separating target 110 and heat sink 140 by distance 147 may allow for electrons 120 to cool during the transportation of electrons 120. As another example, since electrons 120 are emitted from target 110 and returned to target 110, there is not a capacity limitation because electrons 120 are never depleted. As another example, cooling electrically emissive material 310 using electrons 120 may allow for faster manufacture of medical isotopes because the beam current of particle accelerator 304 may be increased without deforming electrically emissive material 310.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:
1. A system, comprising:

a heat sink configured to cool electrons, the electrons being emitted from a target in response to an impingement of a plurality of particles on the target, wherein the heat sink and the target are separated by a distance;

a return member configured to return the electrons from the heat sink to the target, the return member configured to couple to the heat sink and the target;

a first temperature sensor configured to measure a temperature of the target; and a processor configured to receive the temperature of the target through the first temperature sensor and to control flow of the electrons from the heat sink back to the target based at least in part on the received temperature.

2. The system of claim 1, wherein the target comprises a leading edge of a wing of an aerial vehicle.

3. The system of claim 1, wherein the target comprises an electrically emissive material.

4. The system of claim 1, wherein a ratio of a cross-sectional area of the heat sink to a cross-sectional area of the target is greater than one.

5. The system of claim 1, further comprising a cooling device configured to cool the heat sink using a coolant.

6. The system of claim 5, further comprising:

a first temperature sensor configured to measure a first temperature of the heat sink;

a second temperature sensor configured to measure a second temperature of the target; and a processor configured to determine whether to adjust a rate of flow of the coolant from the cooling device to the heat sink based on the first temperature and the second temperature.

7. A system, comprising:

a heat sink configured to cool electrons, the electrons being emitted from a leading edge of a wing of an aerial vehicle in response to an impingement of air on the leading edge of the wing, wherein the heat sink is separated from the leading edge of the wing by a distance;

a return member configured to return the electrons from the heat sink to the leading edge of the wing, the return member configured to couple to the heat sink and the leading edge of the wing;

a first temperature sensor configured to measure a temperature of the leading edge; and a processor configured to receive the temperature of the leading edge through the first temperature sensor and to control flow of the electrons from the heat sink back to the leading edge based at least in part on the received temperature.

8. The system of claim 7, wherein the return member comprises a wired connection.

9. The system of claim 7, wherein a ratio of a cross-sectional area of the heat sink to a cross-sectional area of the leading edge of the wing is greater than one.

* * * * *

UNITED STATES PATENT AND TRADEMARK OFFICE
CERTIFICATE OF CORRECTION

PATENT NO. : 10,935,285 B2
APPLICATION NO. : 15/919463
DATED : March 2, 2021
INVENTOR(S) : Edward Henry Allen et al.

It is certified that error appears in the above-identified patent and that said Letters Patent is hereby corrected as shown below:

On the Title Page

In item (71), under "APPLICANT", please delete "Lockhead" and insert -- Lockheed --, therefor.

Signed and Sealed this
Twenty-fourth Day of May, 2022

Katherine Kelly Vidal
*Director of the United States Patent and Trademark Office*